US010276169B2

United States Patent
Waltermann et al.

(10) Patent No.: US 10,276,169 B2
(45) Date of Patent: Apr. 30, 2019

(54) SPEAKER RECOGNITION OPTIMIZATION

(71) Applicant: Lenovo (Singapore) Pte. Ltd., Singapore (SG)

(72) Inventors: Rod D. Waltermann, Rougemont, NC (US); Timothy Winthrop Kingsbury, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 15/397,435

(22) Filed: Jan. 3, 2017

(65) Prior Publication Data

US 2018/0190297 A1 Jul. 5, 2018

(51) Int. Cl.
*G10L 17/08* (2013.01)
*G10L 17/22* (2013.01)

(52) U.S. Cl.
CPC ............... *G10L 17/08* (2013.01); *G10L 17/22* (2013.01)

(58) Field of Classification Search
None
See application file for complete search history.

(56) References Cited

U.S. PATENT DOCUMENTS

| 6,356,868 | B1 * | 3/2002 | Yuschik | G10L 17/14 704/246 |
| 2009/0190737 | A1 * | 7/2009 | Dunmire | G10L 17/02 379/207.13 |
| 2011/0178931 | A1 * | 7/2011 | Kia | G06Q 10/06 705/50 |
| 2011/0221566 | A1 * | 9/2011 | Kozlay | G06F 21/35 340/5.53 |
| 2011/0288866 | A1 * | 11/2011 | Rasmussen | H04L 12/1831 704/246 |
| 2014/0259138 | A1 * | 9/2014 | Fu | H04L 63/083 726/7 |
| 2014/0324649 | A1 * | 10/2014 | Marshall | G06Q 10/1091 705/32 |
| 2018/0035475 | A1 * | 2/2018 | Hsieh | H04W 76/10 |
| 2018/0041519 | A1 * | 2/2018 | Murrells | H04L 63/107 |

* cited by examiner

*Primary Examiner* — Fariba Sirjani
(74) *Attorney, Agent, or Firm* — Ference & Associates LLC

(57) ABSTRACT

One embodiment provides a method, including: receiving, at an information handling device, voice data; receiving, at the information handling device, user identification data from at least one user device; determining, using a processor, a voice signature subset from a database of users, wherein the voice signature subset comprises voice signatures associated with a plurality of users identified using the user identification data; and identifying at least one user associated with the voice data by comparing the received voice data to the voice signature subset. Other aspects are described and claimed.

12 Claims, 3 Drawing Sheets

SPEAKER RECOGNITION OPTIMIZATION

BACKGROUND

Information handling devices ("devices"), for example smart phones, tablet devices, laptop computers, and the like, are capable of receiving and analyzing voice input data. For example, a device can receive the voice input data when a user is providing dictation to the device, conversing with another user using the device, providing commands to the device or an application on the device, and the like. The device can use the voice input data to determine various characteristics ("voice biometrics") associated with a user's voice. Advances in technology have enabled users to leverage this voice biometric data to develop speaker recognition methodologies. These methods may be used to determine the identity of an unknown speaker.

BRIEF SUMMARY

In summary, one aspect provides a method, comprising: receiving, at an information handling device, voice data; receiving, at the information handling device, user identification data from at least one user device; determining, using a processor, a voice signature subset from a database of users, wherein the voice signature subset comprises voice signatures associated with a plurality of users identified using the user identification data; and identifying at least one user associated with the voice data by comparing the received voice data to the voice signature subset.

Another aspect provides an information handling device, comprising: a processor; a memory device that stores instructions executable by the processor to: receive voice data; receive user identification data from at least one user device; determine a voice signature subset from a database of users, wherein the voice signature subset comprises voice signatures associated with a plurality of users identified from the user identification data; and identify at least one user associated with the voice data by comparing the received voice data to the voice signature subset.

A further aspect provides a product, comprising: a storage device that stores code, the code being executable by a processor and comprising: code that receives voice data; code that receives user identification data from at least one user device; code that determines a voice signature subset from a database of users, wherein the voice signature subset comprises voice signatures associated with a plurality of users identified using the user identification data; and code that identifies at least one user associated with the voice data by comparing the received voice data to the voice signature subset.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
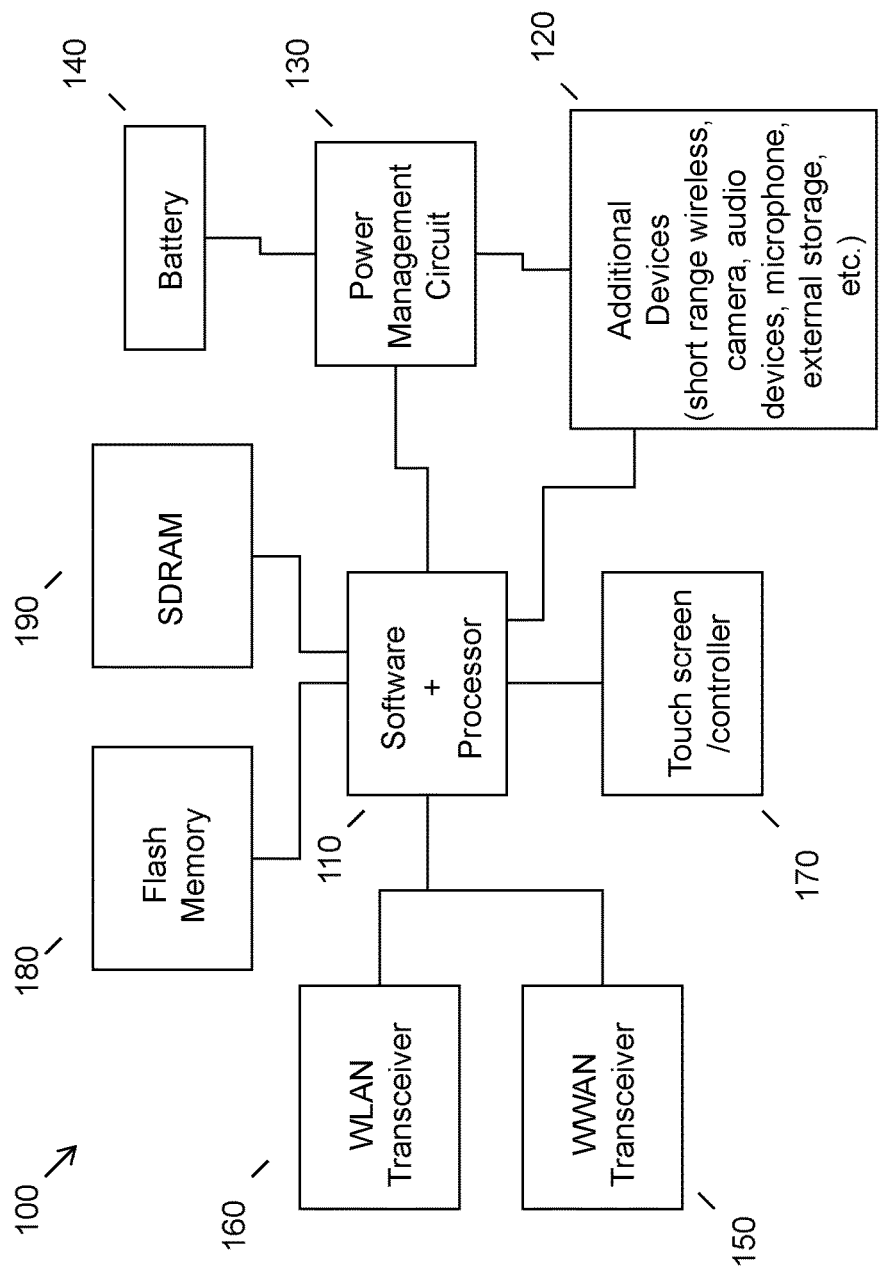
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

User or speaker recognition applications use speech or audio data to recognize particular users or speakers providing the speech or audio data. These applications may leverage the acoustic features of speech (e.g., voice pitch, speaking style, rate of speech, etc.), which have been found to differ between individuals, to recognize the user. These applications are often employed by devices to determine an unknown speaker's identity and may be utilized in a variety of settings. For example, speaker recognition may be employed in company meetings or court room hearings where it may be useful to identify (e.g., in a recording, etc.) the identity of the person associated with a particular segment of speech. Speaker recognition may also be employed in forensic situations, for example, where a crime has been committed and the voice of the criminal needs to be verified from a recorded message, and the like.

Conventionally, a device capable of speaker recognition must first be trained to recognize a particular user's voice. For example, the device must first receive (e.g., during a dedicated training session, as a speech sample with an identified speaker, etc.) voice data from a user. The voice data may then be analyzed (e.g., to determine voice biometrics, to determine voice characteristics, etc.) and stored (e.g., in a database, a data storage location, etc.) as a voice signature or a voice print. After receiving subsequent voice input, the subsequent voice input may be compared against multiple voice signatures, for example, all those voice signatures in the database, data storage location, and the like, in order to determine the best match.

However, these conventional methods provide issues related to long processing times during the comparison process. Speaker identification is unlike speaker verification applications. In speaker verification applications a single user is compared to a single stored voice print to determine if the speaker is the same as the speaker corresponding to stored voice point. Thus, in the speaker verification applications there is generally a 1:1 match (e.g., where one speaker's voice is matched to one voice print). Speaker identification, on the other hand, is a 1:N match, where the voice input is compared against N voice prints. For example, in order to identify a speaker at a company meeting, the speaker's voice needs to be compared against stored voice prints for all employees in that company. This could present issues when there are hundreds, or even thousands, of employees in the company. Therefore, depending on the amount of voice prints stored in a database, it may take a long time to identify a single speaker.

Accordingly, an embodiment provides a method for more efficiently determining the identity of a speaker. In an embodiment, user identification data (e.g., a digital fingerprint, biometric data, user credentials, etc.) received from a user's personal device (e.g., smart phone, tablet, laptop computer, personal computer, etc.) may be used to assemble a subset list of voice signatures. In an embodiment, the subset list may be assembled from a database containing voice signatures for all users of a particular group (e.g., all employees in a company). Upon receiving voice input from a user, an embodiment may compare the received voice input against voice signatures in the subset list rather than voice signatures in the entire database. Such a method reduces the comparison time in speaker recognition systems by limiting the number of voice signatures that must be compared against received voice inputs.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, microphones, biometric devices, etc. System 100 often includes a touch screen 170 for data input and display/rendering. System 100 also typically includes various memory devices, for example flash memory 180 and SDRAM 190.

Figure 2:
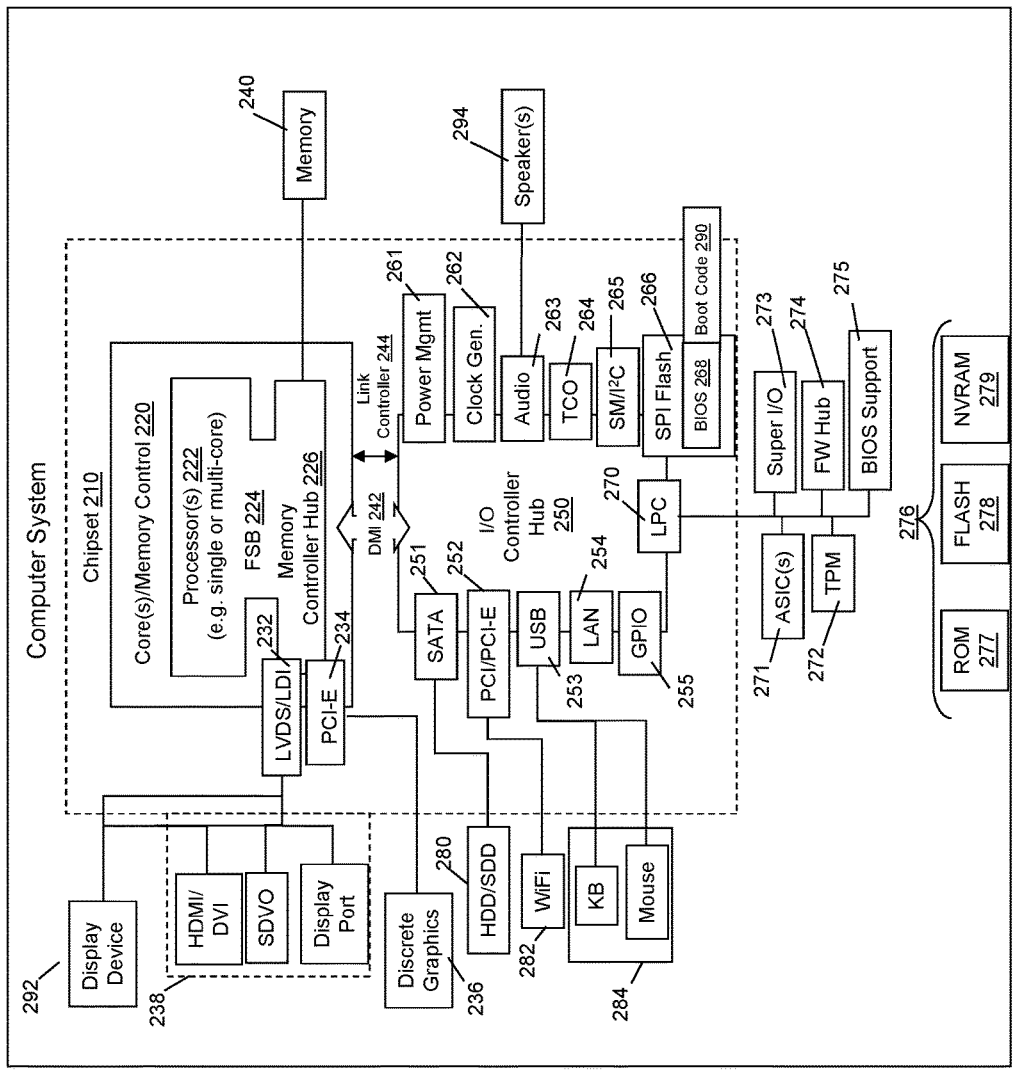
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices which may be used to identify a user by comparing received voice input from the user to a voice signature subset. The devices may also be used to capture user identification data to cultivate the subset. For example, the circuitry outlined in FIG. 1 may be implemented in a tablet or smart phone embodiment, whereas the circuitry outlined in FIG. 2 may be implemented in a personal computer embodiment.

Figure 3:
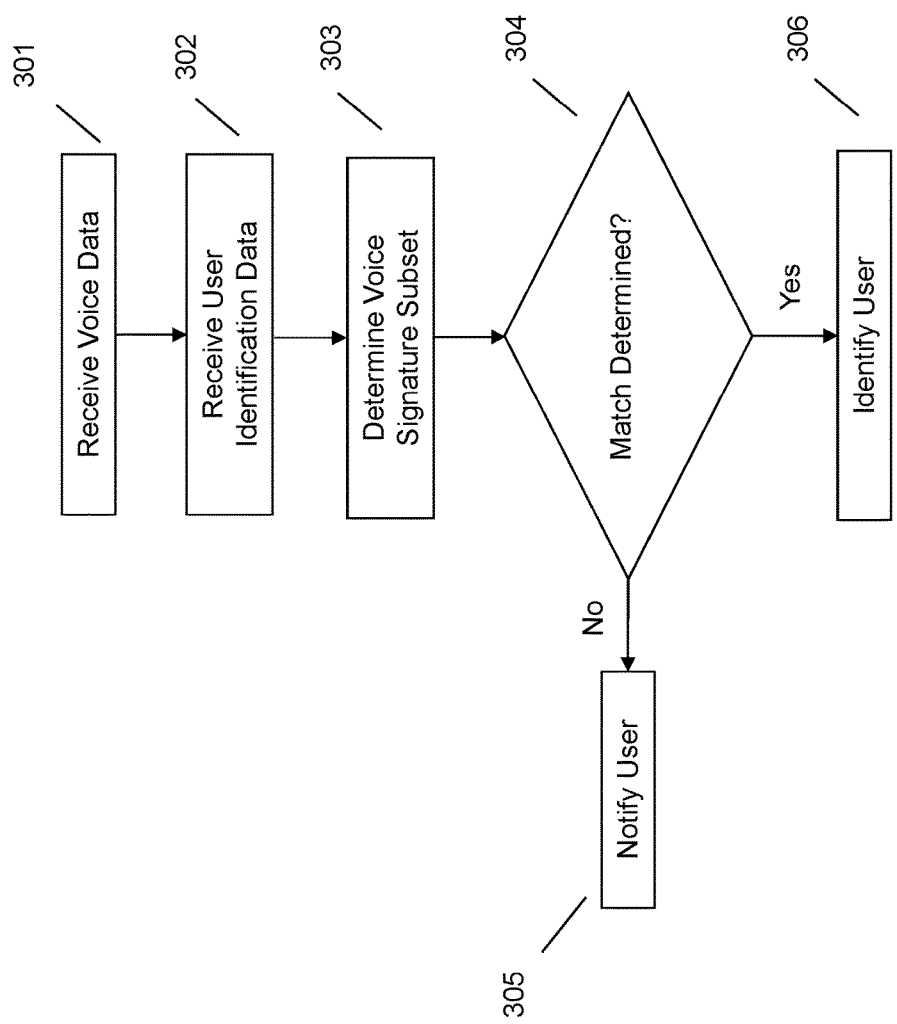
FIG. 3 illustrates an example method of optimizing speaker recognition.

Referring now to FIG. 3, an embodiment may identify a user by comparing received voice input from the user to a determined voice signature subset. At 301, an embodiment may receive voice input from a user, or a group of users, at an input location (e.g., a microphone, speech capture device, etc.) operatively coupled to a speech recognition device. In an embodiment, voice input may be received from one user at a time or may be received from multiple users simultaneously. For example, in the context of a company meeting, multiple participants may be speaking at once.

In one embodiment, the speech capture device may be integral to the speech recognition device. Alternatively, the speech capture device may be connected via a wireless or wired connection to the speech recognition device. For example, the speech may be captured using a microphone integral to a user device and then transmitted to the speech recognition device via a wired or wireless connection. The speech recognition device may include one or more devices. In other words, the device may include software which provides for the comparison of the voice input. Alternatively, the device that captures or receives the audio data may transmit the audio data to another device for processing and analysis.

At 302, an embodiment may receive user identification data from a personal device associated with the user. In an embodiment, the personal device may be any device that can provide identification information associated with the user (e.g., smart phone, tablet, laptop, personal computer, etc.). In an embodiment, the user identification data may be any piece of data that may provide an indication as to who the user might be (e.g., digital fingerprint, user-associated passcode, user credentials, biometric data, device data, etc.). For example, a user may log onto a user account on a laptop computer. The user account information may be used to identify the user of the laptop. As another example, a user may have a personal phone that has an associated device identifier (e.g., IMEI, MAC, etc.). The device identifier may be associated with a particular user that can be used to identify the user. In such an example, the device identifier does not need to particularly identify the user (e.g., Joe's Phone, etc.), rather, the device identifier may merely be associated with a user (e.g., Device159 is associated with Joe, etc.). For example, a database may contain the associations of a device with a particular user.

Similarly, because a particular device may be associated with a user, for example, in a database, lookup table, and the like, the device does not have to receive user identification data that specifically identifies the user. Instead, an embodiment may receive some identification data that can be associated with a particular user. For example, a company may assign laptop computers to users. Each laptop computer may have a serial number. In a database, each device serial number may be associated with a particular user. Therefore, the system may identify the serial number of the device and subsequently identify the user based upon the serial number lookup. The user identification may also be identified from other methods and techniques. For example, an embodiment may access a calendar invite and identify all the users invited to a meeting. The user identification data may then be based upon the meeting invitees. A similar method can be used with meeting agendas, courtroom agendas, and the like.

An embodiment may communicate the identification information to the speaker recognition device using a wireless or wired connection, for example, a BLUETOOTH connection, near field communication (NFC), cloud communication, through a network connection, or other wireless or wired transmission technique. For example, a participant in a meeting may have their smart phone with them and that smartphone may broadcast (e.g., through a BLUETOOTH connection, near field communication connection, network connection, etc.) user identification information to the device responsible for speaker recognition.

In an embodiment, a single, dedicated speaker recognition device may be used. For example, a digital assistant (e.g., Echo® for Amazon®, etc.) may be positioned in a central location in a room and may receive voice input and identification data from the surrounding users and user personal devices. In an embodiment, the speaker recognition device may be set (e.g., by a user, by default, etc.) to recognize information broadcast from all users within a specified range (e.g., 15 meters, 10 feet, etc.), within a predefined area (e.g., a room defined by virtual boundaries, a room defined within a building map, a previously identified area, etc.).

In another embodiment, each user's personal device may act in conjunction with the speaker recognition device. For example, in the context of a company meeting, each user may have a laptop computer and each of those computers may receive and broadcast user identification data. If, for example, there are ten computers in the meeting room but only one computer is trained to identify a user's voice, that computer may "vouch" for the identity of the user and transmit the user's identification information to, for example, the speaker recognition system.

At 303, an embodiment may determine a voice signature subset from a database of voice signatures. In an embodiment, the database of voice signatures may contain, for example, voice signatures for each member associated with a particular organization (e.g., each employee in a company, each person within a particular building, etc.). In an embodiment, the database can be stored locally (e.g., on the device), remotely (e.g., the cloud, network storage location, etc.), or a combination of both. In an embodiment, the subset may be a grouping of all the voice signatures for users associated with a particular situation (e.g., a meeting, a courtroom hearing, etc.).

The subset may be created by using the received user identification data to identify a stored voice signature, associated with an identified user, in the database of voice signatures. To create the subset an embodiment may use the user identification data to cull the database of voice signatures. For example, in a database including one hundred users, the system may only pull the voice signatures associated with the identified users for comparison. In creating the subset an embodiment may compare the user identification data with user identification data associated with the voice signatures in the database. Upon a match, the system may flag that voice signature as one to be used for comparison. After flagging all the voice signatures which correspond to the identified users, the system may continue with the comparison for identifying the speaker. In another embodiment, the subset may be created by accessing the metadata information in a calendar invite. For example, an embodiment may identify (e.g., from an email invite, calendar invite, meeting agenda, etc.) all the members invited to a particular meeting and create a subset of voice signatures comprising voice signatures from all the invited members.

Responsive to determining a match between the received voice input and a voice signature in the voice signature subset at 304, an embodiment may identify, at 306, a user who provided the speech input. In an embodiment, the received voice input may be compared against the voice signatures in the voice signature subset. In an embodiment, the comparison may involve, for example, comparing voice biometric data associated with the received voice input to the biometric data in the voice signature. Responsive to determining a match between the received voice input and at least one voice signature in the subset, an embodiment may determine the identity of a user associated with the voice input.

In an embodiment, responsive to determining the identity of a user, an embodiment may authenticate a user for access. For example, a user may be required to submit voice input before being granted access to a particular document, application, device, etc. For example, an embodiment may unlock a document only for members invited to a particular meeting. In such a situation, the participants may be required to submit voice input (e.g., by saying a vocal pass phrase, saying the user's name, etc.). A speaker recognition device may then determine the identity of the user by comparing the user's voice input to the voice signatures in a voice signature subset (e.g., created by identifying the meeting participants in a calendar invite, created using other methods as described herein, etc.). Subsequent to identifying that the speaker of the voice input was an invited participant, an embodiment may grant the user access to the document.

In an embodiment, additional data related a meeting aspect (e.g., meeting time, date, location, purpose, etc.) may be determined. In an embodiment, one or more meeting aspects may be determined, for example, by pulling metadata from a calendar invite. For example, a meeting invite may be sent (e.g., by email) to a number of employees in a company. The invite may contain metadata information related to the meeting such as meeting time (e.g., 9 am), meeting date (e.g., Dec. 19, 2016), meeting location (e.g., $2^{nd}$ floor conference room), and meeting purpose (e.g., identified in the meeting title, e.g., "Quarterly Profit Review Meeting"). An embodiment may pull the metadata from the invite and associate the metadata with the voice data and the identified user. For example, an embodiment may identify that an employee, Tim, stated the phrase, "Welcome to the meeting everyone, sorry that I'm running late" at 9:06 am on December 19th at a meeting related to reviewing quarterly profits that took place in the $2^{nd}$ floor conference room.

At 305, responsive to not determining a voice signature that is associated with the received voice input, an embodiment may notify the user that an identification could not be determined. In an embodiment, the notification may be vocal (e.g., output from a speaker on the device), verbal (e.g., a text box that appears on the device's display screen), or a combination thereof. The system may also revert to prior methods for speaker recognition, for example, by comparing the voice input to all known voice signatures, etc.

The various embodiments described herein thus represent a technical improvement to conventional speaker recognition techniques. Using the techniques described herein, an embodiment may identify a speaker by comparing received voice input from the speaker to a stored voice signature in a voice signature subset determined from a database of voice signatures. Such techniques reduce the processing time for systems utilizing speaker recognition. Additionally, such techniques provide for more accurate recognition because the system is comparing against a smaller known subset making the results more accurate.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, being performed by an information handling device, comprising:
    receiving, at a microphone of the information handling device, voice of one or more users and obtaining voice data;
    receiving, at the information handling device, user identification data from at least two user devices located proximate to the information handling device, wherein the user identification data provides an identity of at least two users, each of the at least two users being associated with one of the at least two user devices;
    creating a voice signature subset from a database of voice signatures associated with a group of users, wherein the creating comprises pulling, from the database, voice signatures associated with a group of individuals located proximate to the information handling device as identified from the identification data; and
    identifying at least one user associated with the voice data by comparing the received voice data to the voice signature subset,
    wherein the receiving the user identification data further comprises receiving the user identification data by a wireless transmission technique,
    wherein the wireless transmission technique comprises at least one wireless transmission technique selected from the group consisting of Bluetooth and near field communication, and
    wherein the voice signature subset comprises fewer voice signatures than the database of voice signatures.

2. The method of claim 1, wherein the voice data comprises voice data received substantially simultaneously from a plurality of users.

3. The method of claim 1, further comprising authenticating a user for access to the information handling device based upon the identification of the user.

4. The method of claim 1, wherein the identifying comprises identifying the at least one user from a database of users, wherein the database of users comprises a database of voice signatures for a plurality of users larger than the voice signature subset.

5. The method of claim 1, further comprising receiving additional data related to the at least two users and associating the additional data with the voice data.

6. The method of claim 5, wherein the additional data comprises at least one meeting aspect selected from the group consisting of meeting time, meeting date, meeting location, and meeting purpose.

7. An information handling device, comprising:
    a microphone;
    a processor;
    a memory device that stores instructions executable by the processor to:
    receive voice of one or more users at the microphone of the information handling device and from the voice obtain voice data;
    receive user identification data from at least two user devices located in a space proximate to the information handling device, wherein the user identification data provides an identity of at least two users, each of the at least two users being associated with one of the at least two user devices;
    create a voice signature subset from a database of voice signatures associated with a group of users, wherein the creating comprises pulling, from the database, voice signatures associated with a group of individuals located proximate to the information handling device as identified from the identification data; and
    identify at least one user associated with the voice data by comparing the received voice data to the voice signature subset,
    wherein the instructions executable by the processor to receive the user identification data further comprise instructions executable by the processor to receive the user identification data by a wireless communication technique, and
    wherein the wireless transmission technique comprises at least one wireless transmission technique selected from the group consisting of Bluetooth and near field communication, and
    wherein the voice signature subset comprises fewer voice signatures than the database of voice signatures.

8. The information handling device of claim 7, wherein the voice data comprises voice data received substantially simultaneously from a plurality of users.

9. The information handling device of claim 7, wherein the instructions are further executable by the processor to authenticate a user for access to the information handling device based upon the identification of the user.

10. The information handling device of claim 7, wherein the instructions executable by the processor to identify comprise instructions executable by the processor to identify the at least one user from a database of users, wherein the database of users comprises a database of voice signatures for a plurality of users larger than the subset.

11. The information handling device of claim 7, wherein the instructions are further executable by the processor to receive additional data related to the at least two users and associate the additional data with the voice data.

12. A product, comprising:
    a storage device that stores code, the code being executable by a processor and comprising:
    code that receives voice of one or more users at a microphone of an information handling device and from the voice obtains voice data;
    code that receives user identification data from at least two user devices located in a space proximate to the information handling device, wherein the user identification data provides an identity of at least two users, each of the at least two users being associated with one of the at least two user devices;
    code that creates a voice signature subset from a database of voice signatures associated with a group of users, wherein the creating comprises pulling, from the database, voice signatures associated with a group of individuals located proximate to the information handling device as identified from the identification data; and code that identifies at least one user associated with the voice data by comparing the received voice data to the voice signature subset, wherein the receiving the user identification data further comprises receiving the user identification data by a wireless transmission technique, and wherein the wireless transmission technique comprises at least one wireless transmission technique selected from the group consisting of Bluetooth and near field communication, and wherein the voice signature subset comprises fewer voice signatures than the database of voice signatures.

* * * * *